United States Patent [19]

Wegner

[11] Patent Number: 4,685,415
[45] Date of Patent: Aug. 11, 1987

[54] APPARATUS FOR ENVELOPING A BATTERY PLATE BY A DIP PROCESS

[75] Inventor: Paul C. Wegner, San Carlos, Calif.

[73] Assignee: Tiegel Manufacturing Co., Belmont, Calif.

[21] Appl. No.: 728,662

[22] Filed: Apr. 29, 1985

Related U.S. Application Data

[63] Continuation of Ser. No. 597,475, Apr. 6, 1984, Pat. No. 4,524,509, which is a continuation-in-part of Ser. No. 482,874, Apr. 7, 1983, abandoned, which is a continuation of Ser. No. 253,283, Apr. 13, 1981, abandoned.

[51] Int. Cl.⁴ .................. B05C 11/10; B05C 3/05; B05C 3/10
[52] U.S. Cl. ...................... 118/58; 118/61; 118/425; 118/429; 118/503; 118/612
[58] Field of Search .............. 118/425, 612, 429, 61, 118/421, 694, 503, 58; 137/392

[56] References Cited

U.S. PATENT DOCUMENTS

| 364,344 | 6/1887 | Hard | 429/49 |
|---|---|---|---|
| 756,176 | 3/1904 | Meyaret | 429/137 |
| 760,897 | 6/1904 | Meyaret | 429/140 |
| 779,553 | 1/1905 | Meygret | 429/212 |
| 994,451 | 6/1911 | Frederickson | 204/2.1 |
| 1,141,251 | 6/1915 | Luthy | 429/137 |
| 1,316,597 | 9/1919 | Schroger | 429/132 |
| 1,433,017 | 10/1922 | McKee | 428/469 |
| 1,725,734 | 8/1929 | Heap | 429/212 |
| 2,184,373 | 12/1939 | Adams | 429/81 |
| 2,241,176 | 5/1941 | Boecler et al. | 118/68 X |
| 2,256,105 | 9/1941 | Shank | 136/19 |
| 2,422,130 | 6/1947 | Proctor | 136/81 |
| 2,522,416 | 9/1950 | Weiskopf | 118/503 |
| 2,554,803 | 5/1951 | Wysocki | 118/612 X |
| 2,569,361 | 9/1951 | Willihnganz | 136/145 |
| 2,673,230 | 3/1954 | Brennan | 429/137 |
| 2,759,039 | 8/1956 | Clark | 136/148 |
| 2,772,322 | 11/1955 | Witt et al. | 429/254 |
| 2,845,469 | 7/1958 | Tiegel | 429/137 |
| 3,023,261 | 2/1962 | Louis et al. | 429/137 |
| 3,035,110 | 5/1962 | Corren | 136/145 |
| 3,542,596 | 11/1970 | Arrance | 136/6 |
| 3,625,771 | 12/1971 | Arrance et al. | 429/136 |
| 3,632,700 | 1/1972 | Oglevee | 118/694 X |
| 3,766,106 | 10/1973 | Yurimoto et al. | 429/254 |
| 4,232,100 | 11/1980 | Magnusson et al. | 429/217 |
| 4,251,605 | 2/1981 | Inoue et al. | 429/145 |

FOREIGN PATENT DOCUMENTS

| 664290 | 6/1963 | Canada | 429/137 |
|---|---|---|---|
| 1890 | of 1901 | United Kingdom . | |
| 274208 | 8/1927 | United Kingdom . | |

Primary Examiner—Evan K. Lawrence
Attorney, Agent, or Firm—Benasutti & Murray

[57] ABSTRACT

An apparatus for enveloping a battery plate with a microporous battery separator material by a dip method. The method involves first removing air bubbles from the plate by dipping the plate in a liquid, then dipping the plate into a polymer-solvent-filler suspension. After removal from the polymer-solvent-filler suspension, the plate is dried by evaporation or contacted with a nonsolvent and then dried. The result is the formation of a microporous separator envelope about the battery plate. The apparatus comprises a plurality of tanks for housing components for the production of the envelopes, into which tanks a battery plate can be sequentially dipped. Additionally, the apparatus includes a screen between the first two tanks for attracting liquid when contacted by a wet battery plate, a dryer, and a plate carrier.

5 Claims, 29 Drawing Figures

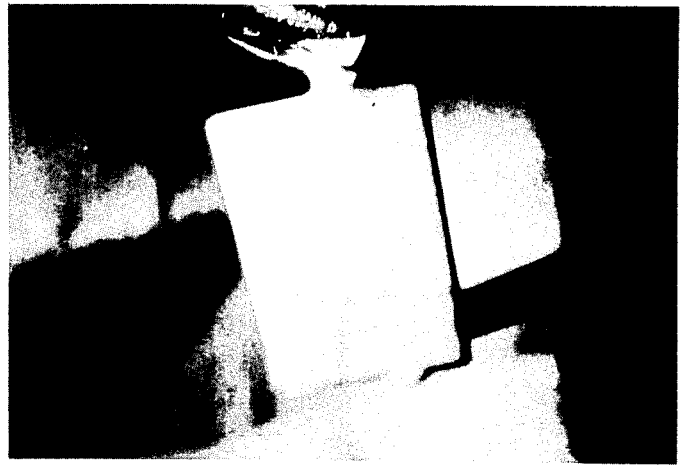
FIG. 4 (PRIOR ART) PLATE BA--WET AIR BUBBLES
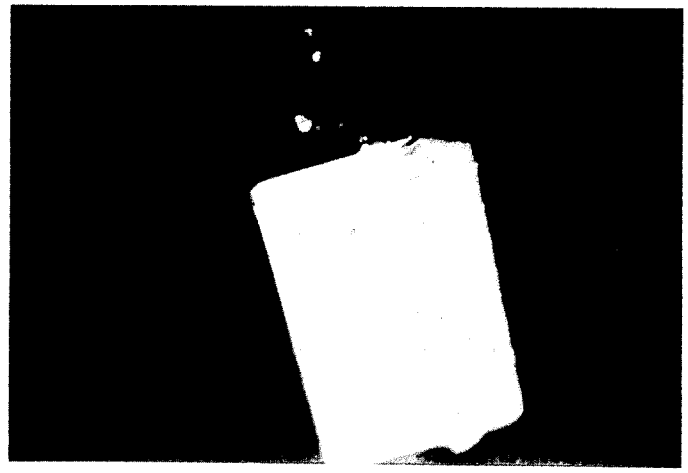
FIG. 5 (PRIOR ART) PLATE BA-- DRYED. PINHOLES

PLATE AA--LACK OF WETTING BY SUGAR SOLUTION

PLATE AA--AIR DRYED WITH PLASTIC COATING AND PINHOLES. BUBBLES

PLATE AB-- SPLITTING DUE TO SHRINKAGE

PLATE AC-- FLAWS DUE TO AIR BUBBLES

PLATE AD--AIR BUBBLES COATED WITH PLASTIC

PLATE AD-- AIR BUBBLES COATED WITH PLASTIC

PLATE AE--PINHOLES FROM AIR BUBBLES

PLATE AF--PINHOLES FROM AIR BUBBLES

APPARATUS FOR ENVELOPING A BATTERY PLATE BY A DIP PROCESS

CROSS-REFERENCE TO RELATED APPLICATIONS

This application is a continuation of application Ser. No. 597,475, filed Apr. 6, 1984, now U.S. Pat. No. 4,524,509, which is a continuation-in-part of my prior co-pending application Ser. No. 482,874, filed Apr. 7, 1983, entitled "Process For The Formation Of Battery Separators And Product Produced Thereby," now abandoned, which in turn was a continuation of my prior application Ser. No. 253,283, filed Apr. 13, 1981, entitled "Process For The Formation Of Battery Separators And Product Produced Thereby," now abandoned; and this application incorporates by reference the disclosure of those two prior applications as if the disclosure was fully set forth herein.

BACKGROUND OF THE INVENTION

1. Field of the Invention

This invention relates to an apparatus for forming battery separators, and in particular relates to an apparatus for forming a microporous separator envelope about a battery plate, such that the envelope functions as a battery separator for use in a lead-acid battery of the type, for example, used in automobiles.

2. Description of the Prior Art

In the prior art, it has been thought desirable to form a battery separator directly on the battery plate by a method of dipping the plate in one or more solutions. While prior art patents speak of such a process, in fact this desire has not been achieved in commercial practice.

To prevent the positive and negatively charged plates or electrodes of lead-acid batteries from coming into contact with each other, and thereby self-discharging the battery plates, sheets of separator material are positioned between the positive and negative battery plates. This separator material is usually comprised of pre-formed separator sheets which must be positioned either mechanically or manually between the positive and negative electrodes or sealed on three sides about one of the plate types, thereby enveloping them. In today's world of high-speed mass production, these techniques are slow, labor intensive, and most importantly generate large scrap rate losses when automated, and an inefficient process in the manufacture of batteries.

The present invention overcomes this necessity of enveloping the plates with separator material by mechanical process or positioning separator material between the plates. A separator envelop is produced simply by dipping the plate.

Prior patents have approached the idea of dipping or applying a coating on a battery plate. For example, see U.S. Pat. Nos. 756,176 (Mar. 29, 1904), 760,897 (May 24, 1904), 779,553 (Jan. 10, 1905), 994,451 (June 6, 1911), 1,141,251 (June 1, 1915), 1,316,597 (Sept. 23, 1919), 1,433,017 (Oct. 24, 1922), 1,725,734 (Aug. 20, 1929), 2,184,373 (Dec. 26, 1939), 2,256,105 (Sept. 16, 1941), 2,422,130 (June 10, 1947), 2,673,230 (Mar. 23, 1954), 2,759,039 (Aug. 14, 1956), 2,845,469), (July 29, 1958), 3,023,261 (Feb. 27, 1962), 3,035,110 (May 15, 1962), 3,542,596 (Nov. 24, 1970), 3,625,770 (Dec. 7, 1971), 3,265,771 (Dec. 7, 1971), 4,232,100 (Nov. 4, 1980); British Pat. Nos. 1890 (Nov. 30, 1901) and 274,208 (July 19, 1927); and Canadian Pat. No. 664,290 June 4, 1963).

Other separator art patents include U.S. Pat. Nos. 364,344 (June 7, 1887), 2,569,361 (Sept. 25, 1951), 2,772,322 (Nov. 27, 1956), 3,766,106 (Oct. 16, 1973) and 4,251,605 (Feb. 17, 1981).

For the past four years, I have been experimenting largely without success, on methods of dip coating plates to form a commercially acceptable separator thereabout. I tested the disclosures of a number of patents to determine their worth as a practiced matter.

U.S. Pat. No. 2,845,469 (July 29, 1958) discloses the dipping of battery plates ostensibly to form a separator layer directly on the plate. That patent describes the formation of a layer on the outer surfaces of groups of battery plates by withdrawing the plate groups from a specific solution through a comb structure. The separator material and the dipping method disclosed therein do not provide a separator material nor a process for the formation of a separator material on a plate which would be suitable for a commercially useful lead-acid battery.

In evaluating this patent, I chopped ten grams of spun glass into one-quarter inch sections and placed the glass in a high shear mixer with 400 grams of water and shredded it for three minutes. I then blended in 20 grams of Kieselguhr (TLC Grade Baker analyzed), followed by 20 grams of lignin (that is, treated sawdust according to U.S. Pat. No. 2,882,331) followed by 20 grams of dry wheat paste. Finally, I added 4 grams of phenolic resin used by Evan's Products, Paper Separator Division for the production of their current commercial paper separators. All of this was blended until uniform in consistency.

A formed negative plate, that is an electrode, was dipped repeatedly into this solution to try to achieve a coating. I noted that no substantial coating would stick to the plate.

Nonetheless, following the teachings of the U.S. Pat. No. 2,845,469, the plate was allowed to air dry and was baked at 340° F. for five minutes as described in U.S. Pat. No. 2,882,331 to cure the resin properly. The coated plate was photographed as shown in prior art FIG. 1.

I noted that it had no separator and no envelope had been formed about the plate.

I had chosen these ingredients because they were described in the patent and appeared to be the best combination using the patent descriptions.

I also tested the disclosure of this patent using the following formulation:
  200 grams wheat flour
  4000 grams water
  200 grams Hi-Sil-233(finely divided silica $SiO_2$)
  200 grams ammonium lignosulfate
  100 grams chopped (¼ inch) glass fiber
  40 grams CASCO resin (5 H) (Urea Formaldehyde made Bordens Chemical)

These ingredients were combined as directed by U.S. Pat. No. 2,845,469.

The coating suspension was not thick enough to coat a battery plate as disclosed. In fact, when only half the required amount of water was added, the coating suspension still would not coat the plate. In an effort to obtain a coating on the plate, the formulation was heated to make the wheat flour thicken the formulation (like gravy) and still the formulation would not thicken enough to yield a coating suspension capable of coating the plate in one dip.

Since the coating suspension was not thick enough to obtain a coating on the plate after one dipping, the plates were subsequently dipped into the suspension and air dried repeatedly. After the material had been applied by repeated dipping and drying, the plates were allowed to air dry for one day and then were soaked in battery acid for one day. The soaking of the plates resulting in the coating falling off the plates and being dissolved.

In an attempt to obtain a coating similar, though not identical, to that disclosed in the patent and enhance its ability to remain in place on the plate, a mixture comprising 50 grams of resin (rather than 40 grams) and 25 grams Hi-Sil-233 (rather than 200 grams) was made. The plates were dipped into this mixture and immediately set up in water. However, the coating material again dissolved after 24 hours in the acid. From this experiment, it would seen that the use of Urea Formaldehyde was unacceptable for creating a battery separator or envelop. Furthermore, the formulation disclosed is not suitable for dip coating a battery plate in order to form a battery separator on the battery plate or an envelop about the plate.

U.S. Pat. No. 4,251,605 discloses a acrylonitrile porous polymer membrane and a process for making it.

Two approaches to the Inoue patent were taken:

(1) 50 grams of polyacrylonitrile-methylacrylate 94:6 copolymer, by Polysciences was dissolved in 250 grams of dimethylformamide (DMF) to form a solution. The solution was cooled down to zero degrees C. with ice. A 50/50 DMF water solution was also cooled down to zero.

A negative electrode was dipped in the cold polymer solution for three minutes. Bubbles appeared upon dipping the plate into the solution. Then the coated plate was immersed in the cold DMF water solution to coagulate the film for 15 minutes. Then the plate was washed in room temperature water for 30 minutes followed by three minutes immersion in a 85 degree C. hot-water bath, and then finally allowed to air dry. A photograph was taken (prior art FIG. 2). This plate was cycled and, compared with a conrol separator, a commercial paper separator of an inexpensive grade. The results of that test are as follows:

TABLE 1

| PLATE # | INITIAL VOLTAGE CYCLE # | | | FINAL VOLTAGE CYCLE # | | | INITIAL AMPERAGE CYCLE # | | | FINAL AMPERAGE CYCLE # | | |
|---|---|---|---|---|---|---|---|---|---|---|---|---|
| | 1 | 2 | 3 | 1 | 2 | 3 | 1 | 2 | 3 | 1 | 2 | 3 |
| CA (INQUE) | 0.0 | 1.30 | 1.25 | 0.0 | 0.55 | 0.75 | 0 | 36 | 34 | 0 | 14 | 22 |
| CONTROL | 1.32 | 1.45 | 1.40 | 0.75 | 0.85 | 0.77 | 37 | 40 | 42 | 20 | 24 | 26 |

These figures show inferior cranking performance.

A physical inspection of the material shows that it adhered to the surface of the plate, rather than formed an envelop and that it had unacceptable levels of pinholes clearly visable in prior art FIG. 2.

It will be noted that in conducting this test, I did not use the nitric acid suggested by the patentee, because the acid would have reacted with the plate and generated large amounts of hydrogen gas bubbles which would have increased the number of pinholes.

I conducted a further test on this patent's disclosure, based on the best example which had the best listed separator properties, as follows:

(2) 50 grams of polyacrylonitrile-methylacrylate 94:6 copolymer, by Polysciences was dissolved in 250 grams of 70% nitric acid to form a solution. The solution was cooled down to zero degrees C., with ice. A 40% nitric acid solution was also cooled down to zero.

A negative electrode was dipped in the cold polymer solution for three minutes. Bubbles appeared upon dipping the plate into the solution. Then the coated plate was immersed in the cold 40% nitric acid solution to coagulate the film for 15 minutes. Then the plate was washed in room temperature water for 30 minutes followed by three minutes immersion at 85 degrees C. hot water bath and then finally allowed to air dry. The plate is identified as Plate CB in prior art FIG. 3. This shows that, as a practical matter, the material was so destroyed that it was totally unacceptable as a battery separator or enveloping material.

U.S. Pat. No. 3,023,261 discloses a separator coating for alkaline nickel-cadmium cells. In accordance with this disclosure, one would first dip the plate in mixture consisting of a water insoluble synthetic resin (such as, polyvinyl chloride and, copolymers of various acrylonitrile-vinyl chloride compositions and, polyvinyl butyral, cellulose acetate, polyvinyl chloride or polyvinyl acetate) dissolved in a water soluble solvent, and a filler which is water swellable but insoluable in the polymer solvent. Next one would dip the plate in water to extract the solvent from the coating and set the resin.

In evaluating this patent the following examples were prepared in the following manner:

Polyvinyl chloride 100 grams (Geon 140×30 by B. F. Goodrich), was dissolved in diemethylformamide (DMF) 600 grams (636 ml). Cornstarch (400 grams) was added to the solution to form a coating mixture. This mixture was filtered through a sieve to eliminate any possible lumps. A dry charge negative electrode was dipped into the mixture for 3 minutes and then pulled out. Photograph prior art FIG. 4 was quickly taken. It shows the air bubbles which will become pin holes. The plate was allowed to soak in water for five minutes. Then the plate was washed in cold water for two hours and air dryed in a 60° C. forced-air oven for one hour.

This plate passed the electrical pin hole test, but still leaked 10 milliamperes of current. The coating showed unacceptably large pin holes as indicated in the photograph of plate BA, prior art FIG. 5.

It passed the electrical pin hole test, due to the great thickness of the coating.

The coating suspension gelled on standing for a few hours which made it unusable for purposes of dipping; the solvent having swelled the water swellable filler.

Polyvinyl butyral, by Aldrich Chemical Co., 7.5 was dissolved in methyl alcohol 120 grams. Then 45 grams of carboxyethyl cellulose, by Hercules, was added and the mixture mixed under high shear. A negative electrode was dipped into the coating suspension for three minutes and then immersed into water for five minutes. A photo was taken, prior art FIG. 6. It shows that no significant coating resulted. Then the plate was washed in water for two hours and labeled as plate BC.

Polyvinylidene chloride, Saran Resin F-310 by Dow Chemical, 13.4 grams was dissolved in 108 grams of DMF (Dimethylformamide). Then 40 grams of polyvinyl alcohol, Gelvatol 20-30 by Monsanto, was blended in at high shear for three minutes. A negative dry charged plate was immediately dipped into the coating mixture for three minutes and then dipped into water for five minutes followed by washing in cold water for two hours. The plate was air dryed in a 60° C. oven for 30 minutes. A photo was taken, prior art FIG. 7, of the plate identified as BD. Again, as will be noted, the pin holes are unacceptable from a commercial battery separator standpoint. Furthermore, this coating suspension also gelled and became ususable after a few hours.

Cellulose acetate (CA-398-3 by Eastman Kodak) 20 grams was dissolved in 150 grams of acetone. Zein (62.5) was undippable so it was placed in a blender at high speed for three minutes. A dry charge plate was dipped for three minutes and then immersed in water for five minutes, followed by washing in cold water for two hours. The plate was dryed in a 60 degrees C. oven for 10 minutes. The plate BB, prior art photo FIG. 8, indicates commercially unacceptable pin holes due to air bubbles.

The results of the cycle tests are described in Table II.

a solution of tetra acetate of cellulose and tetra butyrate of cellulose or a solution of tetra butyrate of cellulose or a solution of caster-oil, essence of turpentine and nitrate of cellulose.

In testing the disclosure of this patent, the following solutions were prepared:

A. Cane Sugar, 150 grams; Water, 850 ml. Light Syrup.
B. Cane Sugar, 500 grams; Water, 500 ml. Medium Syrup.
C. Cane Sugar, 667 grams; Water, 333 ml. Heavy Syrup. (Saturated Sugar Solution)
D. Cellulose Acetate, 30 grams; Tetrahydrofuran, 200 ml.
E. Cellulose Acetatebutyrate, 60 grams; Tetrahydrofuran, 200 ml.
F. Cellulose Acetate, 30 grams; Methylethylketone, 200 ml.
G. Cellulose Acetate Butyrate, 60 grams; Methylethylketone, 200 ml.

The cellulose acetate and cellulose-acetate butyrate were from Eastern Kodak and are respectively known as CA398-3 and CAB381-0.5.

| | | | | COMBINATIONS TRIED | | | |
|---|---|---|---|---|---|---|---|
| PLATE AA # | SUGAR | | | SUGAR SOAK Time | AIR DRIED | PLASTIC COATING Type | SOLVENT | PLASTIC SOAK Time |
| | L | M | H | | | | | |
| AA | — | — | X | 10 min. | Yes | CA | THF | 30 min. |
| AB | — | X | — | 24 hrs. | No | CA | THF | 30 min. |
| AC | — | X | — | 5 min. | No | CAB | THF | 30 sec. |
| AD | — | X | — | 5 min. | No | CA | MEK | 30 sec. |
| AE | X | — | — | 10 min. | No | CA | THF | 30 sec. |
| AF | X | — | — | 30 min. | No | CAB | MEK | 30 sec. |

CA = Cellulose Acetate
CAB = Cellulose Acetate Butyrate
L = Light
M = Medium
H = Heavy
THF = Tetrahydrofuran
MEK = Methylethylketone Typical procedure:
Plate immersed in sugar solution for 10 minutes then immediately dipped into plastic solution for ½ minute

TABLE II

| | INITIAL VOLTAGE CYCLE # | | | FINAL VOLTAGE CYCLE # | | | INITIAL AMPERAGE CYCLE # | | | FINAL AMPERAGE CYCLE # | | | LOUIS |
|---|---|---|---|---|---|---|---|---|---|---|---|---|---|
| PLATE # | 1 | 2 | 3 | 1 | 2 | 3 | 1 | 2 | 3 | 1 | 2 | 3 | EXAMPLE # |
| BA | 1.0 | 1.25 | 1.25 | 0.5 | 0.55 | 0.55 | 24 | 32 | 30 | 14 | 14 | 16 | 3 |
| BB | 0.3 | 0.30 | 0.35 | 0.23 | 0.25 | 0.27 | 8 | 8 | 12 | 6 | 6 | 12 | 8 |
| BC | 0.0 | 0.0 | 1.5 | 0.0 | 0.0 | 0.75 | 0 | 0 | 45 | 0 | 0 | 24 | 5 |
| BD | 1.18 | 1.35 | 1.37 | 1.05 | 0.65 | 0.75 | 36 | 36 | 40 | 14 | 18 | 24 | 6 |
| CONTROL | 1.32 | 1.45 | 1.40 | 0.75 | 0.85 | 0.77 | 37 | 40 | 42 | 20 | 24 | 26 | |

Results of this test show that the material not only did not provide an acceptable separator material because of the inclusion of unacceptable pin holes, but also did not provide an acceptable envelope material because of the close adherence of the material to the plates which depressed electrical performance due to electrolyte starvation.

U.S. Pat. No. 779,553 issued Jan. 10, 1905 discloses the use of a first coat applied to a plate which dissolves in the battery electrolyte leaving a second coat as a sheath. This process can be referred to as "leaching". In accordance with the disclosure, the first coat is a syrup formed of lump sugar or saccharose dissolved in water. The second coat is applied by dipping in a solution comprised of, for example, tetra acetate of cellulose or followed by air-drying.

Typical results:
There was inadequate wetting of plate by the sugar solution. There was bubble formation upon dipping the plate into the plastic solution and then pinhole formation upon drying the plate.

The cellulose acetate film dissolved in battery acid after soaking at room temperature for less than 24 hours.

All the plates had pinholes. This was indicated visually and with an electronic pinhole test.

The Electronic Pinhole Test was as follows:
The coated plate was placed on a metal stand. Then a potential of one kilo volt AC is applied between the stand and plate. If more than 15 milliamperes passes through the coating, a pinhole was present.

The plates were charged for 10 hours and allowed to stand on open circuit. Each cell was discharged across a 0.1 or 0.5 ohm resistor for one minute. The initial and final voltages and amperages were recorded. Three charge, discharge cycles were performed. The experimental plates were labeled AA thru AE, (see Table III). The separators AA thru AE disintegrated, except for the control cell, which has a paper separator.

These tests show that this patent, like the others tested, did not produce by one or more dippings in a variety of coatings and compositions, an acceptable battery separator material on the plate or about the plate in the form of an envelope. Thus, the prior art taken either alone or in combination does not show a method of providing by a dip process an acceptable separator material about an electrode nor the product produced by such a method.

TABLE III

| PLATE % | INITIAL VOLTS CYCLE # | | | FINAL VOLTS CYCLE # | | | INITIAL AMPERES CYCLES I | | | FINAL AMPERES CYCLES II | | |
|---|---|---|---|---|---|---|---|---|---|---|---|---|
| | 1* | 2 | 3 | 1* | 2 | 3 | 1* | 2 | 3 | 1* | 2 | 3 |
| AA* | 1.25 | 0 | .15 | 1.3 | 0 | 0 | 12.5 | 0 | 16.0 | 11.5 | 0 | 0 |
| AB* | 1.4 | 0 | 0 | 1.0 | 0 | 0 | 14.0 | 0 | 0 | 10.0 | 0 | 0 |
| AC | .75 | .45 | 0 | .45 | 0 | 0 | 7.5 | 9 | 0 | 4.5 | 0 | 0 |
| AD | .2 | .75 | 0 | .15 | 0.32 | 0 | 2 | 12 | 0 | 1.5 | 6.4 | 0 |
| AE | 0.1 | 1.15 | 0 | 0.1 | 0.55 | 0 | 1.0 | 23 | 0 | 1.0 | 10.6 | 0 |
| Control | 1.5 | 1.25 | 1.25 | 1.3 | .72 | .70 | 13.2 | 21 | 16.0 | 12.2 | 14.4 | 10 |

*Discharged with 0.1 ohm resister. In all subsequent discharge cycles a 0.5 ohm resister was used.

Initially, plates AA and AB gave better results than AD and AE, while plate AC was intermediate. This is because plates AA and AB had coatings, which dissolved in the battery acid and in effect approached being no separator at all. Plates (AD and AE) had coatings, which did not immediately dissolve in the battery; but completely insulated the plate and kept it from conducting electricity. On the second discharge, plates AA, AB, and AC indicated a shorting-out of the plates. On the other hand, plates AD, AE and AF began to lose their coatings, which enabled them to conduct electricity. On the third and last discharge, all the coated plates had electrical discharge curves similar to shorted-out plates. On inspection all the coated plates had lost their coating. The photographs, prior art FIGS. 9 through 17, clearly illustrate the before and after conditions of the plates.

Plates AG and AH were prepared in the following manner:

Cellulose nitrate, by Hercules Grade RS ½, 80 grams was dissolved in 200 milliters of THF (Tetrahydrofuran) then 8 milliliters of caster oil was blended into the solution. A negative lead electrode was soaked in a light sugar solution "G" for 20 minutes. Then the plate was immediately immersed in the solution for three minutes and allowed to air dry. A photo was taken, prior art FIG. 18, and then the plate was labeled AG. Once again, air bubbles formed upon immersion. Cellulose nitrate did not dissolve in turpentine as suggested in the patent. Cellulose nitrate, by Hercules Grade RS ½, 80 grams was dissolved in 200 milliliters of ethyl acetate, then 8 milliliters of castor oil was blended into the solution. A negative lead electrode was soaked in a light sugar solution "G" for 20 minutes. Then, the plate was immediately immersed in the solution for three minutes and allowed to air dry. A photo was taken, prior art FIG. 19, and the plate labeled AH. Once again, air bubbles formed upon immersion.

Of all the plastics tried, in this patent, only cellulose acetate (i.e. tetra acetate of cellulose) was unstable in battery acid. However cellulose-acetate butyrate was unstable when placed between two electrodes and placed on charge.

The cellulose nitrate when placed on charge and cycled was flawed because it had pinholes and electrically insulated the plate.

SUMMARY OF THE INVENTION

It is the primary objective of the present invention to provide an apparatus for carrying out a high-speed process for the enveloping of battery plates with a microporous separator material.

The separator envelope material must be porous, inert to the environment of a lead acid and battery and especially, it should be inert to the strong oxidizing of the positive plate. It should be wettable, free from commercially objectionable pin-holes, conductive to ionic flow, tough and elastic to accommodate plate growth. It is a further object of this invention to use the apparatus to provide such a material by dipping the battery plate in a solution and removing it into an environment in which evaporation completes the process of enveloping the battery plate. A still further object of this invention, is to complete that process with non-toxic materials.

In the light of the noted disadvantages of the previous methods for providing separators and to fulfill the stated objectives, the present invention now provides a high-speed dip process for the enveloping of battery plates in a microporous separator material.

I have discovered that the desirable objectives mentioned above can be achieved by the following method and the use of the following materials. A battery plate to be provided with a separator envelope is first dipped into a liquid in order to fill the pores of the plate and displace any gas bubbles therein. This wet plate is subsequently dipped into a coating liquid consisting of a polymer in solution and inert, insoluble filler particles. The plate is then removed and allowed to air dry, thereby forming a microporous envelope about the plate.

In a further embodiment of my invention, the plate is subsequently dipped into a nonsolvent bath which initiates the precipitation of the polymer in the coating suspension. Then the plate is air dried. More than one dip in the polymer solution followed by the subsequent nonsolvent immersion and partial air drying may be desirable in order to enhance the thickness of the separator material about the edges and corners of the plate.

Advantages of my invention are: separators having extremely small pores and extremely high porosity can be formed; electrodes having very complex geometry can be easily enveloped with separator material; lighter separators can be formed; the separators which are formed have lower electrical resistance; there is a faster flow of electrolyte to the active mass through separators formed by this process; it is possible to vary the thickness of the separator; and the process can be conducted rapidly and continuously. Furthermore, depending on the materials selected, the process can be conducted at room temperature and no waste material byproducts are formed as in the case of most leaching processes.

Still further, with this process, materials can be used which do not seem to poison a lead-acid battery environment the way, for example, starches did (see Vinal, "Storage Batteries", 4th Ed., John Whiley & Sons, Inc., N.Y. 1955, pages 58 and 146.); the materials will stretch and have good tensile strength when wet with electrolyte or dry; and because the material abheres to the plate very closely, more plates per volume of battery case are possible.

BRIEF DESCRIPTION OF THE DRAWINGS

Further objectives and a better understanding of the present invention will be made clear from the following detailed description of the invention taken in consideration with the drawings wherein:

FIGS. 1 through 19 are photographs of plates upon which I conducted tests of prior art disclosures;

BRIEF DESCRIPTION OF THE PREFERRED EMBODIMENT

Figure 1:
Figure 2:
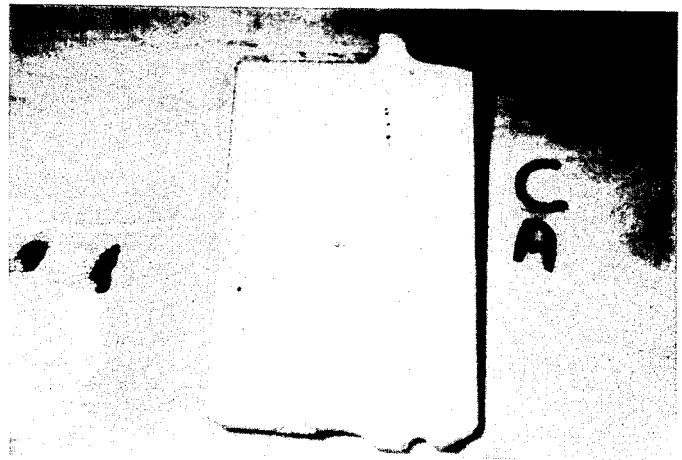
Figure 3:
Figure 6:
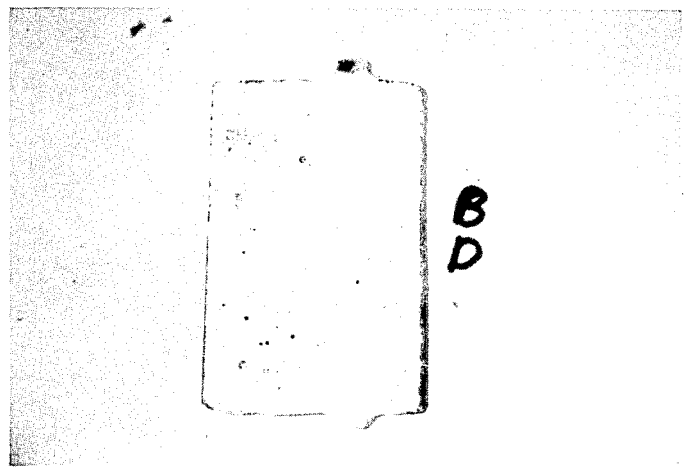
Figure 7:
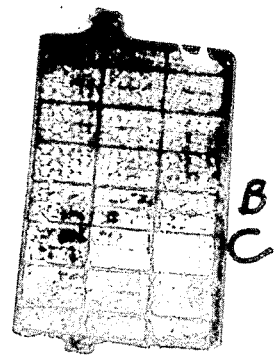
Figure 8:
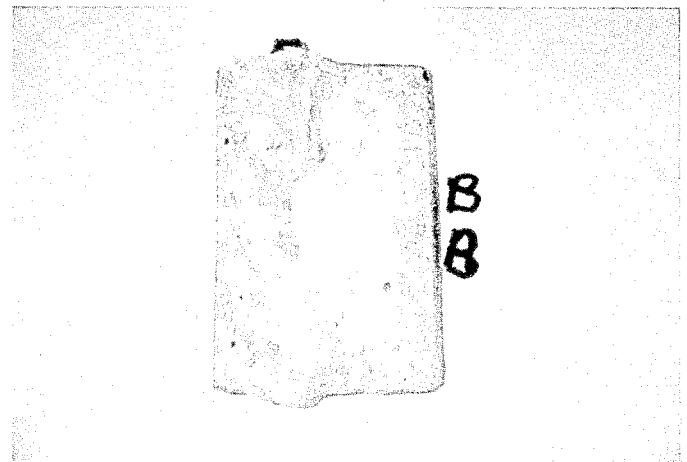
Figure 9:
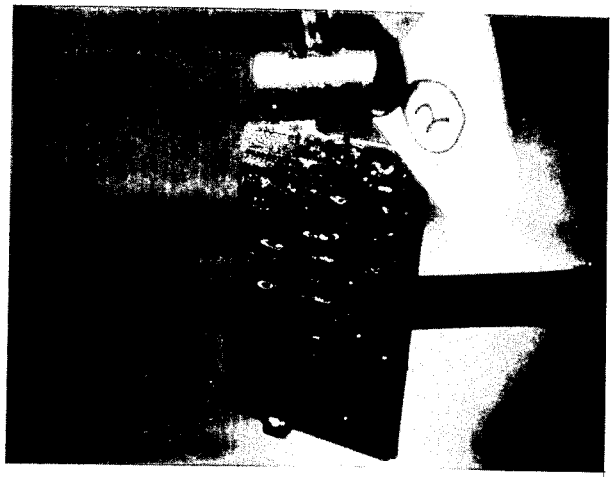
Figure 10:
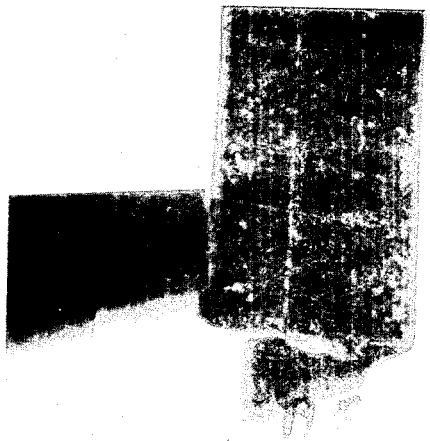
Figure 11:
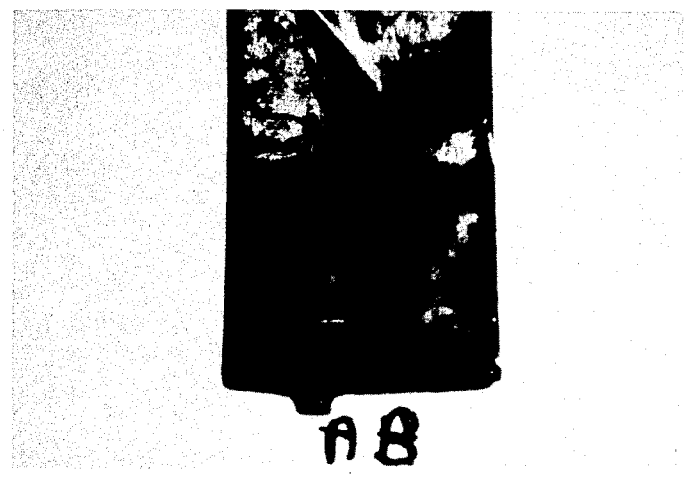
Figure 12:
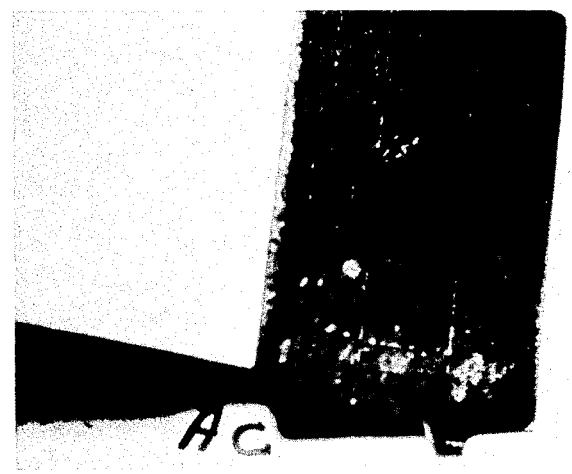
Figure 13:
Figure 14:
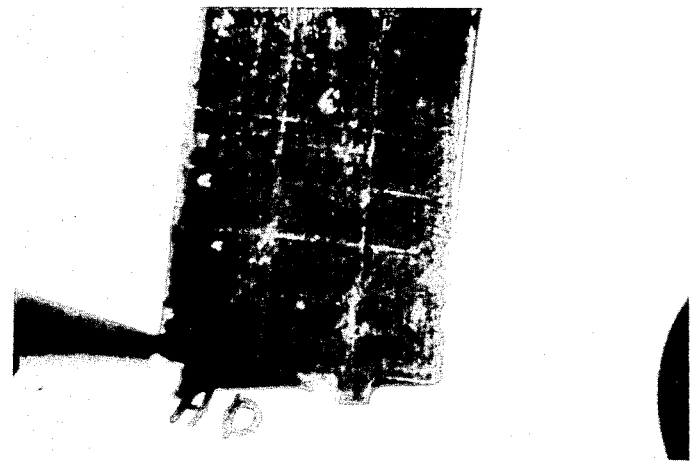
Figure 15:
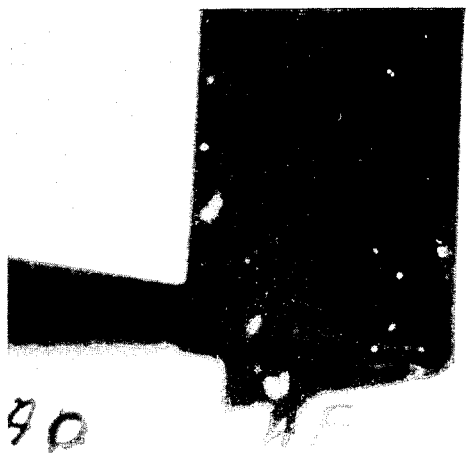
Figure 16:
Figure 17:
Figure 18:
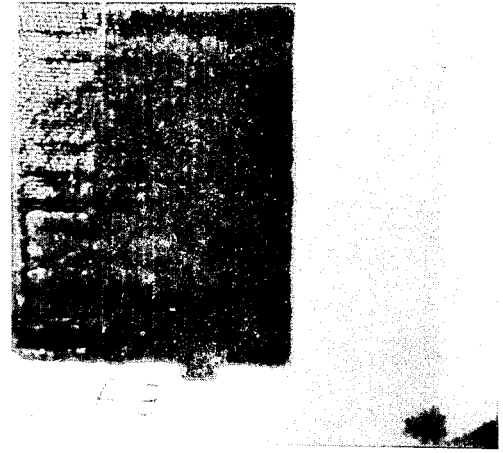
Figure 19:
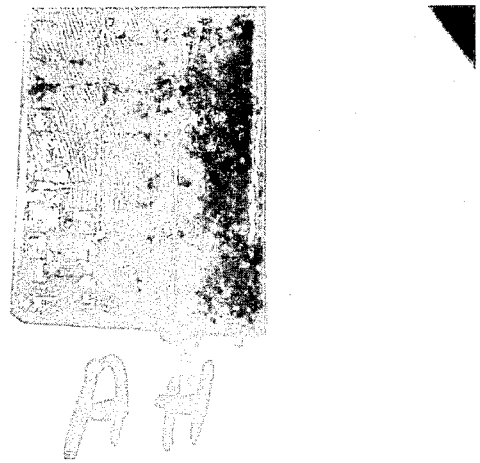

Although specific forms of the invention have been selected for illustration in the drawings, and the following description is drawn in specific terms for the purpose of describing these forms of the invention, this description is not intended to limit the scope of the invention which is defined in the appended claims.

A battery plate envelope of microporous battery separator material and dip methods for preparing the envelopes are taught herein. According to this invention, the envelope may be formed in place directly on a battery plate or electrode. The preferred method is an evaporative process; although in other embodiments, a solvent-nonsolvent process is used in connection with the evaporative process.

If there is any porosity in the plate, it is critical that the plate be treated to fill any pores and displace any gas therein prior to dipping of the plate into the coating solution. Thereafter, the coated plate is allowed to air dry.

Figure 20:
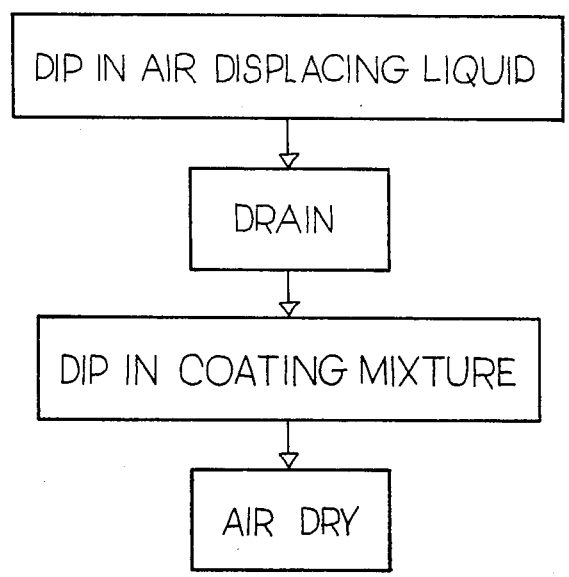
FIG. 20 is a block diagram of the preferred embodiment of the basic process used with the apparatus of the present invention.

The block diagram shown in FIG. 20 more completely shows the formation of a battery separator envelope about a battery plate. A prepasted and formed, or unformed, battery plate which is to be enveloped with separator material according to the most preferred embodiment of the present invention is brought into intimate contact with a liquid that displaces air bubbles. I have found that the material most suitable for this first dip is a solution of a solvent and a non-solvent. One such solvent is methylene chloride and one such non-solvent is methanol. These are mixed in the ratio of 75% methylene chloride to 25% methanol by volume. It is most preferable to mix and retain the mixture in a closed chamber to avoid evaporation and the consequent changing of the composition of the mixture. An advantage of this mixture is that the materials are cheap, they will not support combustion, they have low heats of evaporation, low toxicity values and are non-carcinogenic.

The plates are immersed in this solution to drive out all of the air bubbles from the pores.

It may be desirable to soak the plates to insure that all of the gases are removed. The reason for removing the gases is to prevent the formation of pinholes in the separator material of the envelope during further processing. It is critical to remove this gas.

Once the plates have been dipped and the gas is removed, the plates are removed from the solvent, non-solvent solution and drained until the solvent-non-solvent solution stops dripping from the plates. Here again, this is preferably done in an environment which will not permit evaporation.

The plates are then dipped in a coating mixture (a solution/suspension, which will temporarily form a coating on the plates. This solution/suspension comprises most preferably the following materials in the proporations given:

500 ml. Methylene chloride
100 ml. Methanol
Pb 50 grams Polycarbonate resin (Lexan) as produced, for example, by Rohm & Haas
50 grams Kraton G 1650 as for example, produced by Shell Chemical Company (a Terblock Copolymer consisting polystyrene and poly(ethylene-butylene) blocks to be described more fully hereinafter
100 grams Dicalite WB-5(Diatomaceous earth)

Kraton G 1650 Thermoplastic rubber is described in Shell Chemical Company Technical Bulletin SC:38–80 as follows: a three block copolymer with polystyrene end blocks and a rubbery poly(ethylene-butylene) mid block.

Its typical properties are as follows:

| Typical properties | |
| --- | --- |
| Tensile properties[1] | |
| Tensile strength psi | 5,000 |
| Elongation at break % | 500 |
| Modulus at 300% extension psi | 800 |
| Film appearance | Clear water white |
| Solution viscosity[2] | |
| 20% w in toluene cps | 1,500 |
| 25% w in toluene cps | 12,000 |
| Crumb size | About ½ inch |

[1]Measured on films cast from toluene instron jaw separation rate ten inches per minute temperature 23° C. dumbbell specimens cut with ASTM die C
[2]Measured with a Brookfield Model RVT viscometer The above ingredients are mixed until uniform. I have found that they provide a coating which has a high tensile strength, just enough elasticity to accommodate plate growth, a very high oxidation resistance, excellent electrical properties particularly useful in reducing plate formation times and presents a slick outside surface to prevent separator damage. As noted above, the percentage of methylene chloride to methanol is different than the ratio of the same two substances in the first dip solution. This difference enhances the process; particularly with respect to the twin problems of trying to get a solution which will adher to the plate temporarily without permitting the polymer to migrate too far into the pores of the plate.

For best results, the plate should be lowered at a slow uniform rate into the coating mix and removed at a slow uniform rate. This will prevent air bubbles from being drawn in on dipping and will likewise prevent the coating from being stripped off on removal of the plates from the mixture.

Once removed, the plates are permitted to dry in air. This evaporates the solvent methylene chloride first to produce a gelled coating. Upon further drying, the methanol evaporates leaving the plate enveloped in a microporous separator material having all of the desirable characteristics previously described. In using the word envelope, I am characterizing the condition to that of a letter being in an envelope, in the sense that the material is not adhered to the plate and is a separate cohesive wrapping about the plate.

This process may be enhanced by adding Cab-O-Sil (fumed Silica) to the solvent-non-solvent mixture of the first dip at a ratio of 10 to 30 grams per liter. The enhancement is in the fact that it makes the surface of the plate smoother which is particularly desirable for edge coverage and further insures that the subsequent coating will not adhere to the plate.

In a modified form of my invention as shown in FIG. 20, I first dip in a solvent/non-solvent solution, but this time the solution comprises cyclohexane and isopropanol which is mixed in the proporation of 75% cyclohexane to 25% isopropanol (approximately).

The second dip also has this solvent and non-solvent. In particular, I used 1400 milliliters of cyclohexane, 600 milliliters of isopropanol, and combined these with 100 grams of Kraton G 1650 and 400 grams of Dicalite WB-5.

Here, however, I mixed the Kraton G in a hot (40° C.) solvent/non-solvent mixture (500 milliliters). The Dicalite was mixed in with the remaining 1500 milliliters of the solvent/non-solvent to form a uniform slurry. The two mixtures were then combined and heated to 40° C. and filtered.

The plates were dipped into the coating suspension after having been dipped in the precoat of solvent/non-solvent to drive off the air bubbles. The plates were removed from the coating suspension and allowed to air dry. As the material cools, it causes the binder (Kraton G 1650) to fall out of solution and gell. This gel coats and binds each Diamataceous earth particle. The solvent mixture evaporates (first the cyclohexane isopropanol azetropic mixture nd then the isopropanol) When completely dried, the binder and filler is left in the form of an envelope about the plate.

What I have described in these preferred processes, is an evaporative process rather than a solvent/non-solvent process (even though I have used the terms solvent/non-solvent). This evaporative process is superior to a solvent/non-solvent process (which I will describe in connection with FIG. 21) which is in effect a leaching process (that is, a liquid pulling out either another liquid or a solid from a coating material).

Figure 21:
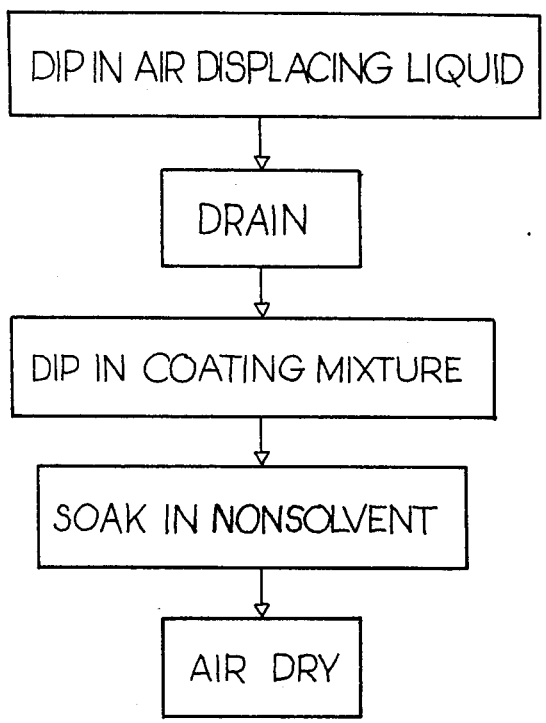
FIG. 21 is a block diagram of a modification of the basic invention showing an additional step.

Such a solvent/non-solvent process is illustrated in FIG. 21 wherein the evaporative process illustrated in FIG. 20 has a further step of dipping in the non-solvent isopropanol (following the coating dip), to remove the cyclohexane from the coating. This dipping in isopropanol takes place immediately after the plates have been withdrawn from the coating material.

Figure 22:
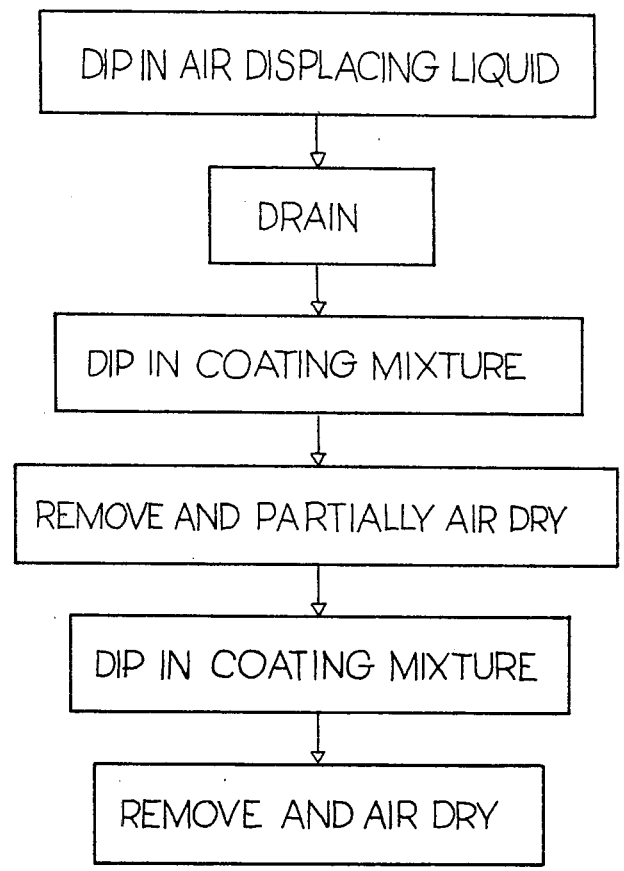
FIGS. 22 and 23 are block diagrams of further modifications of the basic process showing additional steps.

If desirable, to increase the thickness of the coating, an additional modification to the processes comprises adding the step of redipping in the coating mixture. In the evaporative process (FIG. 20), this redipping (see FIG. 22) would take place after partial air drying of the coating, (that is, after the second dip). It is not necessary to fully air dry and indeed it is preferred not to. After this additional dip, however, the plate would be fully air dried.

Figure 23:
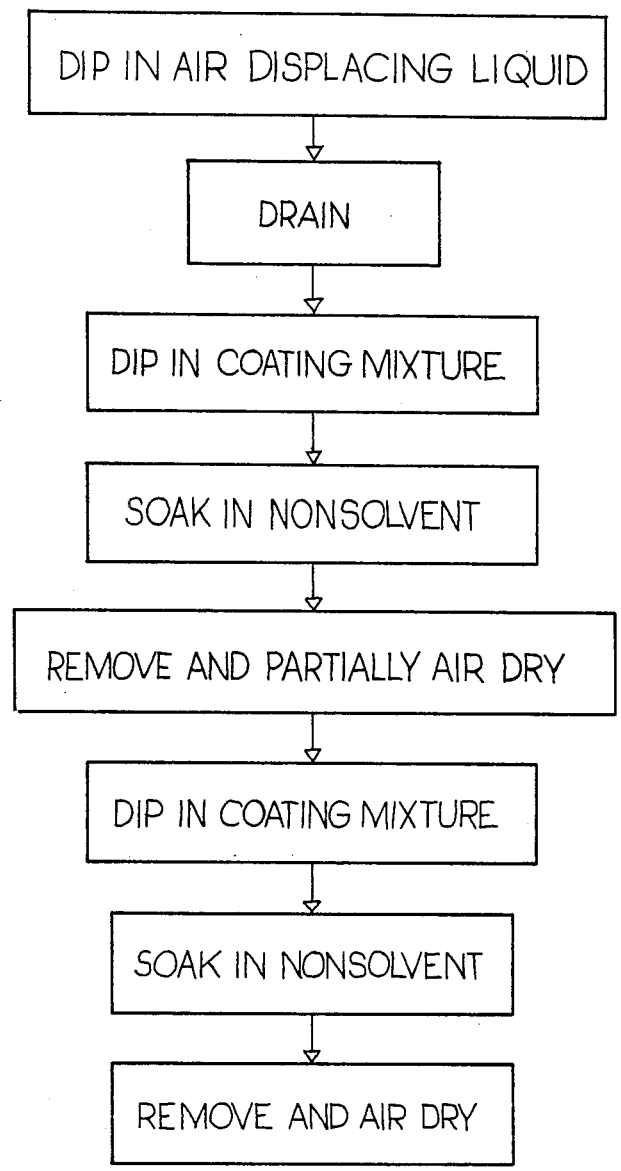

In the solvent/non-solvent process (FIG. 21), the re-dipping (See FIG. 23) would take place after the third dip (in the isropropanol). Here again, it would be preferable to allow the isopropanol to evaporate partially before re-dipping in the coating mixture. After the re-dip, the plate with the coating on it would be dipped in isopropanol and then removed and dried.

Another solvent/non-solvent process is described in great detail in my prior co-pending application, Ser. No. 482,874 filed Apr. 7, 1983 entitled, "Process For The Formation Of Battery Separators and Product Produced Thereby", the disclosure of which is incorporated herein by reference as if fully set forth herein. In accordance with that process, I first immersed the battery plate in a solution which I describe as a surface modifier (heptane) for the purpose of driving off the air bubbles. This was done in a closed chamber.

The plate was then immersed in a solution/suspension mixture consisting of a polymer, solvent (tetrahydrofuran) and a filler (Cab-O-Sil). The polymer was polyvinyl chloride.

Since this was a solvent/non-solvent process, I then immersed the coated plate in heptane.

Further this process is capable of modification as indicated above in that there was the possibility of having a second dip coating followed by a second immersion in solvent.

I have discovered, however, that the use of polyvinyl chloride in this process does not produce as good a coating as the Kraton G.

One embodiment of the present invention as discussed herein (and as set forth in my prior co-pending application) includes both method and equipment. It will be obvious from this discussion that numerous modifications may be made to the method and equipment suggested herein to practice the subject invention.

Figure 28:
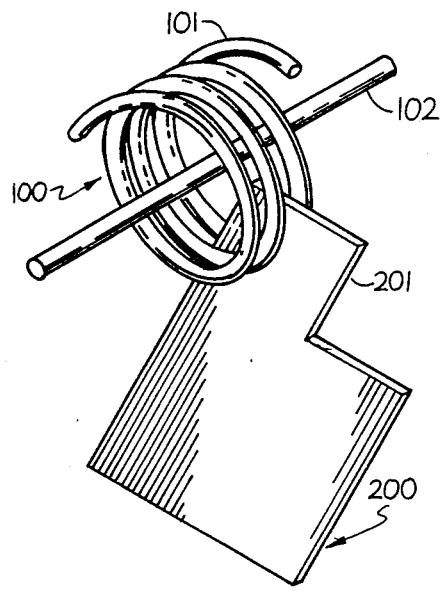
FIG. 28 is a view of a device for transporting battery plates being treated.
Figure 29:
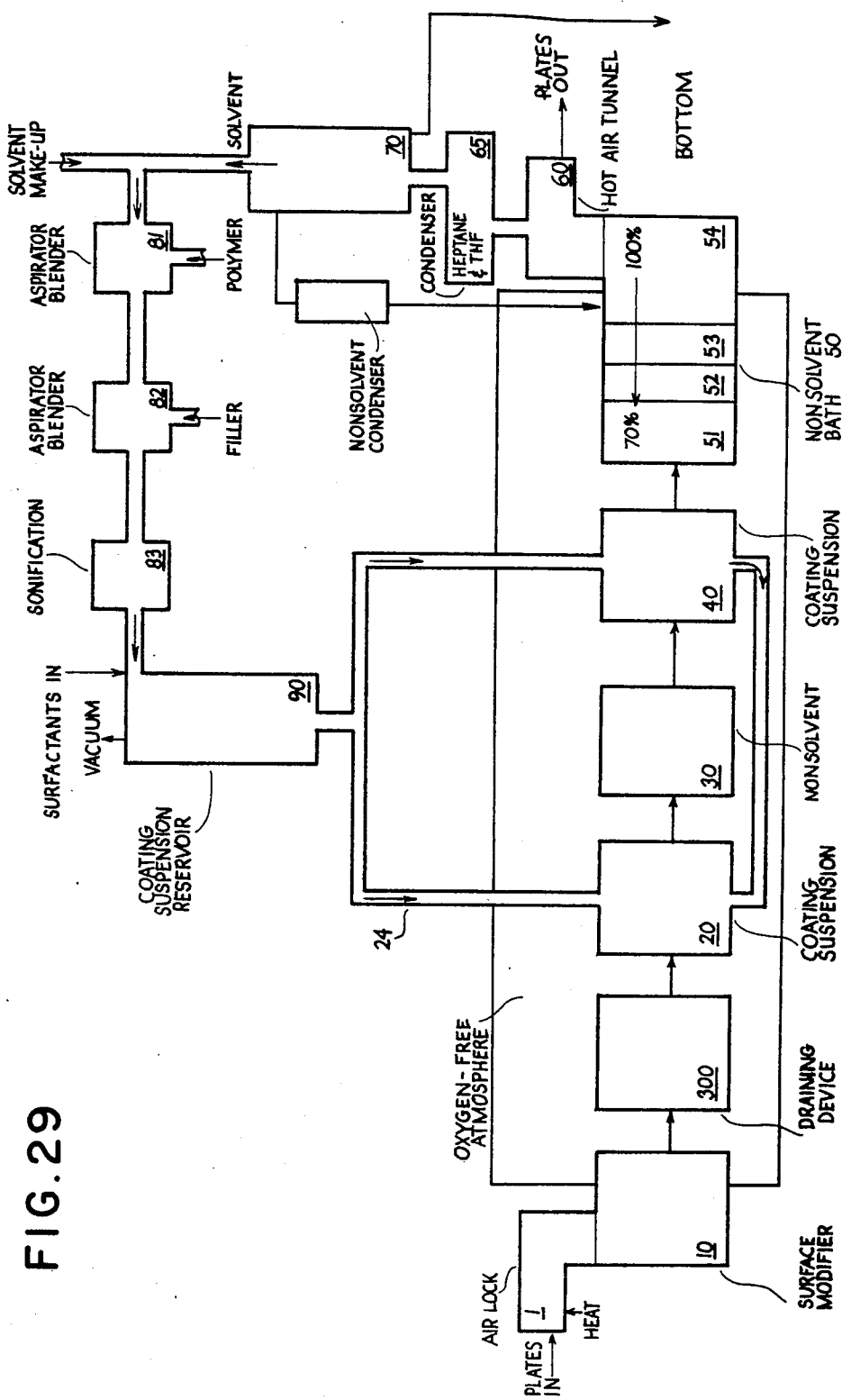
FIG. 29 is a schematic of one embodiment of an apparatus of the present invention.

As shown in FIG. 29, the schematic diagram representing an apparatus for practicing one method of the present invention, prepasted and formed or unformed battery electrodes or plates which are to be treated to provide a separator envelope thereabout are fed into an initial air lock 1. These plates may be transported on a spring-like carrying device 100 (FIG. 28). A spring 101 expands to receive between the helical turns thereof the tabs 201 of a battery plates 200. When the spring 101 is contracted, the plates 200 are held in a spaced relationship between the helical turnings. To add additional support to the spring 101, a rod 102 may be extended therethrough, and thus prevent the spring from collapsing. During the coating process, this spring device may be moved from tank to tank by a suitable means.

Because tetrahydrofuran is extremely volatile and because explosive peroxides may form when the tetrahydrofuran contacts oxygen, when THF solvent is used it is advisable to conduct the coating process in an enclosed system with an oxygen-free atmosphere. For this reason, the air lock 1 is provided at the entrance to the present system as a safety feature. In the air lock 1, ambient air is evacuated in order to eliminate any oxygen from the system. The remaining operations may then be conducted under any atmospheric condition such as using nitrogen or carbon dioxide.

The plates 200 held by the spring device 100 are immersed in a bath 10 of surfaace modifier long enough to displace all of the gas or gases in the battery plates 200. Because it is desireable to maintain the integrity of the pasted battery plates 200, it is desireable to control the submersion rate of the plates into the surface modifier bath 10 so that they are not sumberged too quickly. The immersed plates are soaked for a period of time and then withdrawn from the bath 10.

To increase the efficiency of the bath 10, a circulating pump and filter (not shown) may be installed in the bath 10 in order to circulate and filter the contents. This is beneficial in helping to eliminate gas bubbles in the surface modifier and to remove any lead dust that might build up as a result of paste from the plates falling into the bath.

To further enhance the release of gas bubbles from the plates 200 an ultrasonic pulse may be added to the spring device 100 which would vibrate the plates and cause gas bubbles in the plates to dislodge faster. Care must be taken when using this ultrasonic pulse, however, to prevent the plates from shaking too much and knocking out the active mass from the grid of the plates.

After the plates are removed from the bath 10, the surface modifier must be drained from the plate. The drain time from the plates depends, of course, on the viscosity and temperature of the surface modifier and the size of the plates. It is important to allow adequate draining.

Figure 24:
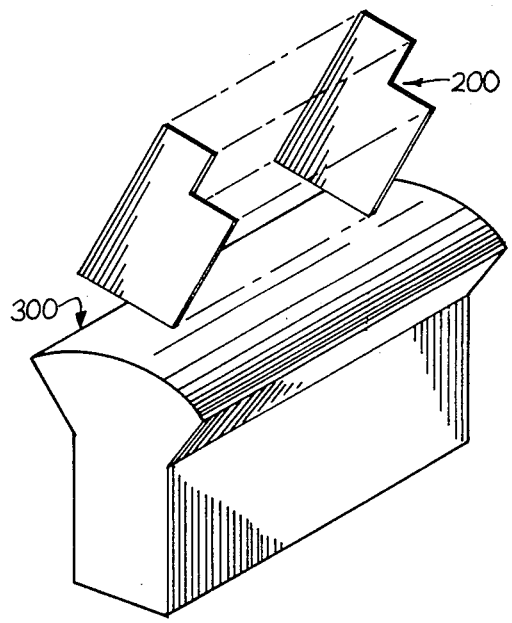
FIG. 24 is a schematic view of a device for expediting the draining of the surface modifier from the plates.

Since the plates are held by the tabs 201, it may also be possible to accelerate the draining of the surface modifier by bringing the plates 200 into contact with a surface, such as a flexible screen 300 (FIG. 24), which by capillary action will literally pull the surface modifier droplets from the plates. This should speed up the time required for the droplets to ordinarily form by gravity and then fall from the plates.

The plates 200 held by the spring might be brought into contact with an absorbent material (such as inert stainless steel felt, cotton or glass wool) for a required period of time. It is important that the absorbent material be somewhat flexible so that lowering these plates into contact with the material does not damage the plates. The absorbent material may be in a configuration (FIG. 24) 3 ft. high which would create a pressure head to continuously cause the surface modifier in the plates in contact with the material to be drawn into the material and away from the plates. It would only be necessary for the tips of the plates to touch this absorbent material for a given time period. Optimum times and materials will vary with the type of plates and modifiers.

Figure 25:
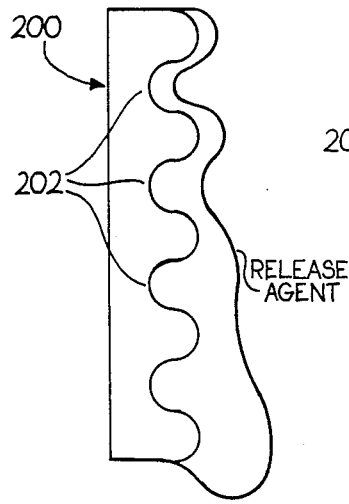
FIGS. 25 and 26 are enlarged cross sectional views of a battery plate surface showing partial and complete draining conditions.
Figure 26:
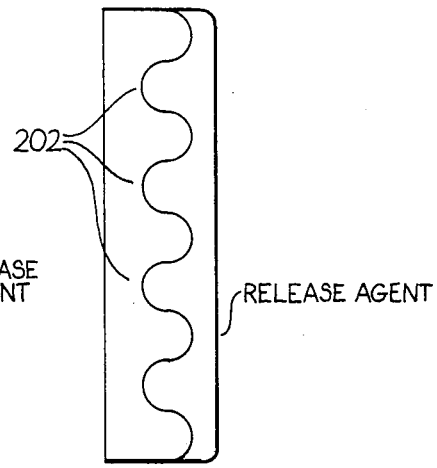

The theory behind why mechanically withdrawing the excess modifier from the plate may be necessary is displayed graphically in FIGS. 25 and 26. The battery plates 200 may have irregularities 202 on their surfaces, and as a result, the surface modifier, due to surface tension, will be held in these irregularities. Draining the surface modifier from the plates prohibits cul-de-sacs from forming in the upper irregularities 202, since the surface modifier may be pulled away quickly. All of the surfaces of the plates should have a fairly even coating of surface modifier, as shown in FIG. 26. When the surface modifier is allowed to drain solely due to gravity, as shown in FIG. 25, the weight of the modifier slowly flowing to the bottom of the plate will probably cause the modifier to be pulled downward and form pockets in the upper irregularities, while a large amount of modifier collects at the bottom of the plate and ultimately encourages sloughing of the lead at the bottom of the plate underneath the coating after the plate has been coated. If the cul-de-dacs form at the top and the surface modifier gathers at the bottom of the plate, there will probably be pinholes at the top due to the lack of an even solvent coating and sloughing at the bottom due to the collecting of surface modifier there.

When heptane is the surface modifier, because heptane has such a low viscosity, all of the special processes for draining of the surface modifier are unnecessary. Heptane drains very quickly due to gravity and leaves an even coating. The draining considerations expressed previously may be essential, however, when more viscous surface modifiers are used.

Figure 27:
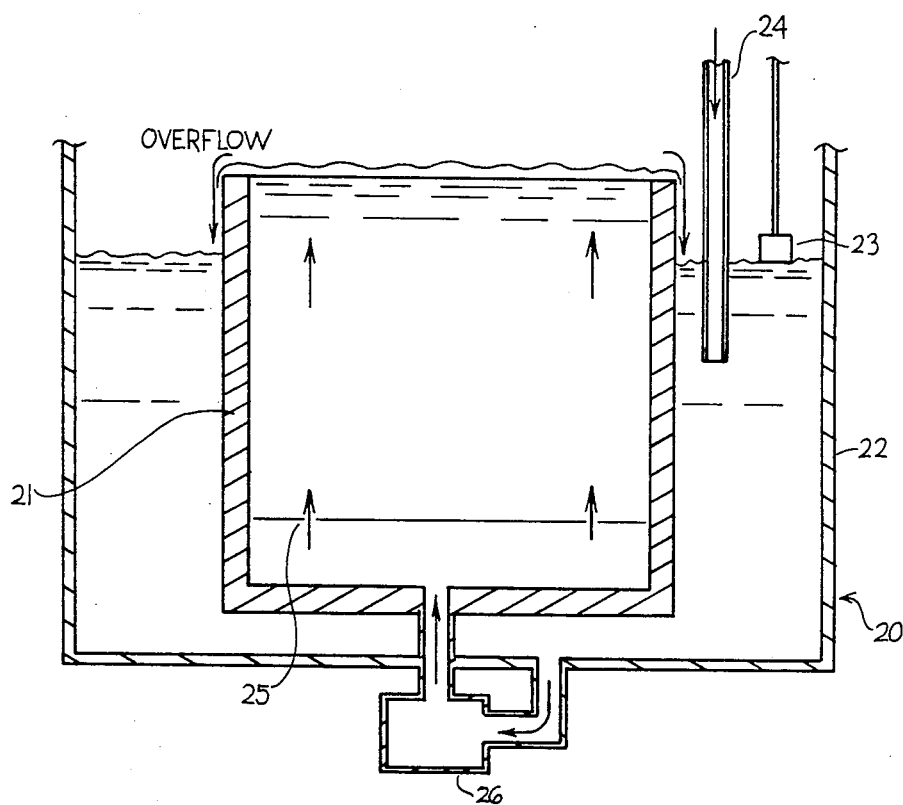
FIG. 27 is an embodiment of a polymer suspension tank.

Once the plates are coated with the surface modifier, they are forwarded to the coating suspension container 20. FIG. 27 discloses a design for the polymer coating suspension tank 20. Primarily, the tank is an overflow bath 21 within a larger container 22 that has a level controller 23. The overflow bath maintains a constant level of the coating solution at all times. This helps to prevent gelled particles or films from forming on the edges or walls of the tank. A circulator pump 26 is provided at the bottom to keep the suspension constantly flowing to maintain a uniform consistency which will in turn insure uniform coating of the plates. A homogeneous suspension will be maintained, which is important since the coating must be an even thickness at all locations on the battery plate. A make-up line 24 is provided to add makeup coating suspension to the outer tank. A mesh screen 25 is provided in the bottom of the tank to filter out any large particles in the coating suspension.

The dipping rate for immersing the plates 200 into the coating suspension tank 20 must necessarily be sufficiently slow to prohibit large quantities of air from traveling along with the plates into the coating suspension (which air may later form pinholes in the polymer coatings). Therefore, it is preferred that the immersion into the coating suspension be slower than the immersion into the surface modifier. This will, again, vary with the size of plate, viscosity of the suspension, etc. Also, it is helpful if the plates enter the coating suspension at a uniform rate to insure even distribution.

Depending on the type of plates and the composition of the coating suspension, the length of time the plates remain in the tank 20 will vary. However, the surface modifier which already coats the outer surface of the plates if it is an appropriate nonsolvent, will immediately begin to combine with the polymer coating solution and precipitate the polymer on the surface next to the plate.

When the plate is withdrawn from the coating suspension, again it is preferred that an even uniform withdrawal be used. As with the insertion, the uniform rate of withdrawal helps to prevent unevenness of the coating. Any fast or jerking motions will cause the suspensions to fall to a lower portion of the plate and thereby destroy the evenness of the coating.

Following the initial immersion in the polymer suspension, the coated plates are immediately dipped into a nonsolvent bath 30 in order to encourage precipitation of the polymer.

It is not important that 100% nonsolvent be used in the initial nonsolvent contact. It is only necessary that the first dip in the nonsolvent provide a sufficient concentration of nonsolvent (here 70% heptane) to at least begin the precipitation process.

The rate of insertion into the nonsolvent bath 30 must be somewhat slow because the coating of the liquid polymer coating suspension on the battery electrode is still fragile on the outer surface. By submerging the coated plate slowly, the integrity of the coating is not damaged.

Upon removal of the plates from the nonsolvent bath 30, a drain time should be allowed in order to allow the nonsolvent to drain from the surface of the coating. At this point, the draining cannot be enhanced by using an absorbent structure such as was suggested following the initial nonsolvent dip, since any contact with the separator coating to remove the nonsolvent will cause damage to the coating.

After the initial immersion in the polymer suspension followed by contact with the nonsolvent mixture, the edges of the plates may have only a very thin separator coating. Accordingly, to eliminate the thin edges which may have formed during the precipitation in the nonsolvent bath, the plates are subjected to immersion in a second coating suspension tank 40. The composition of the second polymer is the same as the first; however, it may be beneficial to adjust the viscosity to get thinner second coats.

Both of the polymer suspensions 20, 40 are maintained at room temperature, but the nonsolvent bath 30 may not need to be maintained at room temperature. If the temperature of the nonsolvent bath 30 is raised above room temperature, it is theorized that the precipitation on the surface of the film will be enhanced. If the two polymer solution baths 20,40 are heated, evaporation can, however, become a problem. For example, in a THF-PVC suspension, THF has a low boiling point, and when heated it is easily driven from the coating solution, thereby affecting the coating properties. Viscosity changes due to temperature, however, should not prove to be a problem. If Cab-O-Sil filler is provided in the coating suspension, the viscosity will remain constant over a wide range of temperatures, assuming no loss of THF due to evaporation. Further, if a THF-heptane nonsolvent bath for PVC is heated above 65° C., it is theorized that the THF will start to boil and bubbles will probably form, and these bubbles may cause pinholes in the separator envelope.

The insertion and removal times for the second polymer suspension tank 40 are the same as for the first polymer suspension tank 20. After the coated plate is removed from the second tank, there is no specific drain time, and the plate may be immediately inserted into a second nonsolvent bath 50 to produce precipitation of the PVC polymer coating suspension.

The second contact with the nonsolvent material may simply be by dipping in a single concentration nonsolvnet composition, or a more complicated process may be used. The purpose of this step is to form the separator into the required microporous material as quickly as possible. To achieve complete precipitation of the polymer, the nonsolvent bath 50 may have a gradient of nonsolvent concentrations through the bath, rather than have a single concentration throughout. If the gradient system is used, both a nonsolvent gradient and a temperature gradient can be maintained from one end of the tank to the other. These gradients can be achieved by using a series of individual tanks with varying concentrations and temperatures in each tank or, perhaps one tank with the variable conditions therealong might be possible. As shown in FIG. 29, the nonsolvent concentration gradient is counter-current to the direction of movement of the plates. In other words, when the plates are inserted into the first tank 51, concentration of the nonsolvent in the nonsolvent solution is lowest; the concentration then increases in the direction of movement of the plates, i.e., tank 52, then tank 53, etc. Because of the increase in nonsolvent concentration, the nonsolvent continuously removes solvent from the plates as the plates move from tank to tank.

The nonsolvent gradient appears to be important in terms of initial contact with the plates which have just been removed from the second coating suspension. It is theorized that if the strongest nonsolvent (100% nonsolvent) is contacted initially, the pore size created by the polymer precipitation will be very small, since the strong nonsolvent concentration will cause the polymer to precipitate quickly at the outer surface of the coating. This should also produce a very tight skin on the outside of the separator which will prevent rapid defusion of the remaining nonsolvent into the rest of the polymer coating, and thus inhibit complete precipitation of the polymer. Also, having the strongest nonsolvent concentration (even 100%) in the last tank should assure complete precipitation of the polymer from the polymer solution due to the high concentration of nonsolvent therein precipitating any remaining polymer.

It may also be helpful to adjust the temperatures of the various tanks or in a continuous gradient in a large single tank to provide an increase in temperature as the nonsolvent concentration increases. If the temperature is high too early it is believed that the outer surface of the separator material will precipitate more quickly and create a tight outer skin which will slow the overall dispersion of the nonsolvent into the coating suspension, thereby inhibiting total precipitation of the polymer or even dissolving the coating due to the high solubility of polymers at higher temperatures. Furthermore, a higher temperature higher concentration gradient may help to continue to precipitate any unprecipitated polymer as the material passes from tank to tank.

If after two coatings the surface pore structure is too large, and it is desired to achieve a separator with very small pores on the outer surface, it may be helpful to dip the twice-coated plate into the coating suspension for a third time followed by immersion in a 100% nonsolvent solution. This third dipping and the immediate contact with the 100% nonsolvent is theorized to cause the polymer to precipitate quickly and produce an outer separator skin with a very tight pore structure.

The plates which are withdrawn from the final 100% nonsolvent tank enter into a closed hot air tunnel 60, without oxygen, where any remaining solvent and nonsolvent vapors are withdrawn. This tunnel may be heated to encourage these vapors to be released. Because of the heat, any remaining solvent will evaporate and the evaporation will cool the plate surface. The vapors which are drawn off may be condensed in a condenser 65 and directed to a boiler 70 for preparation for recycling. After the vapors are withdrawn, the plates can be removed from the chamber 60 as dry, odorless, and slightly warm battery plates encapsulated by microporous separator material. At this point, the plates may be handled by hand and removed for storage.

The solvent can be added hot directly from the boiler 70 to the polymer material or from a make-up solvent supply. In FIG. 29, blending occurs when the hot solvent from the still passes through an aspirator blender 81 which draws polymer particles from a supply of polymer and turbulently mixes the polymer and solvent. In a second venturi aspirator blender 82, filler material is mixed into the polymer solution. For best results the mixing of the filler into the polymer solution should be done under high shear, i.e., the turbulence in the venturi aspirator. Very thin piping is used to get a high velocity effect through the venturi. If the polymer suspension begins to foul the venturis, self-cleaning or heated venturis may be used to prevent the polymer build up. A sonic vibrator 83 might also be added to the system to generate more thorough mixing.

The coating suspension, once it is achieved, is to be stored in a suspension reservoir 90 which is as tall as possible. The pressure head which results from a tall reservoir causes any air bubbles to rise to the top and disperse. Elimination of air bubbles in the suspension is very helpful in preventing the formation of pinholes. This removal may also be accelerated by applying a vacuum to the coating suspension reservoir for a brief (1-2 min.)

Additional observations seem to indicate that deterioration in mechanical properties occurs when approaching approximately 60% filler with respect to the total amount of polymer and filler in the polymer solution/suspension. Furthermore, it appears that a polymer solution/suspension should contain just less than the amount of polymer (with respect to the total amount of polymer and solvent used) than is required to begin to gel the suspension.

Furthermore, it is preferred to have a first liquid to drive out the air bubbles, which is a solvent/non solvent mixture in which the polymer of the second liquid is not 100% soluable.

There are additional advantages of the process. The envelope fits closer to the plates than in the prior art, so it is possible to enclose more plates within the standard battery containers. There is no treeing across or around battery electrodes since the electrodes are entirely encapsulated with the tight-fitting coating. Furthermore, the use of such a battery separator envelope may eliminate the need for mud wells in battery containers, since the tight fit of the separator material will prevent any material from falling from the battery plates. If anything, there may be a necessity to provide a resilient mat at the bottom to protect the envelope from shock and abuse. The negative elctrodes can be made small, since there is no lead lost during the use of the battery. Also, this tight enveloping gives additional strength to the plates and promotes faster formation.

Because the envelope fits closely to the battery plate, lead dust particle formation is inhibited. When the battery becomes heavily sulfated there should be less problem with recharging the battery, since none of the sulfated particles can fall away from the battery plate between the plate and the separator. Furthermore, because of the tight fit of the separator coating, the plates should not start blistering. Blistering is the first step toward sloughing of the active material from the grids.

It will be understood that various changes in the details, materials and arrangements of parts which have been herein described and illustrated in order to explain the nature of this invention may be made by those skilled in the art within the principle and scope of the invention as expressed in the following claims.

It will further be understood that the "Abstract of the Disclosure" is intended to provide a non-legal technical statement of the contents of the disclosure in compliance with the Rules of Practice of the U.S. Patent and Trademark Office, and is not intended to limit the scope of the invention described and claimed herein.

I claim:

1. A coating application apparatus for use in forming an envelope of separator material around a battery plate, said apparatus comprising:
   (a) a plurality of tanks wherein separate selected components for the production of said envelope can be housed, wherein at least one of said components comprises a solvent bearing compound, said tanks arranged in a sequential order for sequential dipping of a battery plate therein to form said envelope;
   (b) a liquid attracting surface comprising a screen disposed between the first and second tank of said sequentially arraged plurality of tanks, said surface attracting and retaining liquid thereon when contacted by a wet battery plate;
   (c) a battery plate drying means disposed sequentially beyond the last tank of said plurality of tanks; and
   (d) carrier means to hold battery plates in suspension and to transport said battery plates from tank to tank, to said liquid attracting surface, and to said drying means.

2. A coating application apparatus as claimed in claim 1 having in addition thereto external mixing means comprising at least one aspirator blender for receiving certain of said components for the mixing thereof and said blender being in communication with at least one of the plurality of tanks for delivery thereto of the mixed material.

3. A coating application apparatus as claimed in claim 2 having in addition thereto solvent recovery means disposed between and in communication with the drying means and the mixing mmeans for delivery to the mixing means of solvent recovered from the drying means.

4. A coating application apparatus as claimed in claim 1 or 3 having an addition thereto reservoir means for receiving component material disposed between and in communication with the mixing means and at least one of the plurality of tanks which receives material for storage and subsequent delivery to the tank of said material.

5. A coating application apparatus as claimed in claim 2 having in addition thereto sonic vibrator means disposed between the blender and the tank downstream thereof for mixing of said material.

* * * * *

UNITED STATES PATENT OFFICE
CERTIFICATE OF CORRECTION

Patent No. 4,685,415           Dated August 11, 1987

Inventor(s) Paul C. Wegner

It is certified that error appears in the above-identified patent and that said Letters Patent are hereby corrected as shown below:

At column 1, line 65 delete ")," after --2,845,469--.
At column 3, line 10 delete "resulting" and insert therefore --resulted--.
At column 3, line 20 delete "seen" and insert therefore --seen--.
At column 3, line 44 delete "conrol" and insert therefore --control--.

At column 5, line 14 delete "ususable" and insert therefore --unusable--.
At column 7, line 63 after "However" insert --,--.
At column 9, line 14 delete "Whiley" and insert therefore --Wiley--.
At column 9, line 37 after the word "of" delete "the".
At column 10, line 41 delete "Pb".
At column 11, line 62 delete "nd" and insert therefore --and--.
At column 12, line 23 delete "isropropanol" and insert therefore --isopropanol--.
At column 12, line 30 before "482,874" insert --06/--.
At column 13, line 16 delete "surfaace" and insert therefore --surface--.

UNITED STATES PATENT OFFICE
CERTIFICATE OF CORRECTION

Patent No. 4,685,415          Dated  August 11, 1987

Inventor(s) Paul C. Wegner

It is certified that error appears in the above-identified patent and that said Letters Patent are hereby corrected as shown below:

At column 14, line 18 delete "cul-de-dasc" and insert therefore --cul-de-sacs--.
At column 15, line 52 delete "propertiess" and insert therefore --properties--.
At column 16, line 2 delete "nonsolvnet" and insert therefore --nonsolvent--.
In claim 3 at line 4 delete "mmeans" and insert therefore --means--.
In claim 4 at line 2 delete "1 or 3" and insert therefore --2 or 3--;

line 2, delete "an" and insert therefore -- in --.

Signed and Sealed this

Thirteenth Day of September, 1988

Attest:

DONALD J. QUIGG

Attesting Officer          Commissioner of Patents and Trademarks